United States Patent [19]

Muñoz Madrid

[11] Patent Number: 5,714,269
[45] Date of Patent: Feb. 3, 1998

[54] FILM COMPOSITE

[75] Inventor: Francisco Muñoz Madrid, Barcelona, Spain

[73] Assignee: Casco Nobel AB, Stockholm, Sweden

[21] Appl. No.: 436,454
[22] PCT Filed: Nov. 17, 1993
[86] PCT No.: PCT/SE93/00985
§ 371 Date: Jun. 29, 1995
§ 102(e) Date: Jun. 29, 1995
[87] PCT Pub. No.: WO94/12347
PCT Pub. Date: Jun. 9, 1994

[30] Foreign Application Priority Data

Nov. 24, 1992 [ES] Spain ................. 9202364

[51] Int. Cl.$^6$ ................. B32B 7/00; B32B 27/42; B32B 3/00
[52] U.S. Cl. ................. 428/500; 428/501; 428/502; 428/503; 428/505; 428/507; 428/511; 428/514; 428/524; 428/526; 428/530; 428/531; 428/535; 428/537.5; 428/304.4; 428/218; 156/272.2; 156/275.5; 156/275.7; 156/306.8; 156/307.1; 156/307.3; 156/325; 156/327; 156/331.1; 156/331.3; 156/331.7

[58] Field of Search ................. 428/500, 501, 428/502, 503, 505, 304.4, 219, 507, 511, 514, 524, 526, 530, 539, 535, 537.5; 156/272.2, 275.5, 275.7, 306.9, 307.1, 307.3, 325, 327, 331.1, 331.3, 331.7

[56] References Cited

U.S. PATENT DOCUMENTS 4,158,712  6/1979  Degens ................. 428/212

FOREIGN PATENT DOCUMENTS 50-075681  6/1976  Japan.

Primary Examiner—Leszek Kiliman
Attorney, Agent, or Firm—Burns, Doane, Swecker & Mathis, L.L.P.

[57] ABSTRACT

A film suitable for continuous application to particle boards in the making of laminated particle board is disclosed, which film is stem penetrable and impregnated with semi-cured impregnating resins and provided with a partially cured layer of glue on one side and a fully cured lacquer layer on the other side, which film is permeable to gases generated during production of laminated particle board. A process for producing such a film is also disclosed and also a method for producing a laminated particle board by means of a continuous direct lamination process.

12 Claims, 3 Drawing Sheets

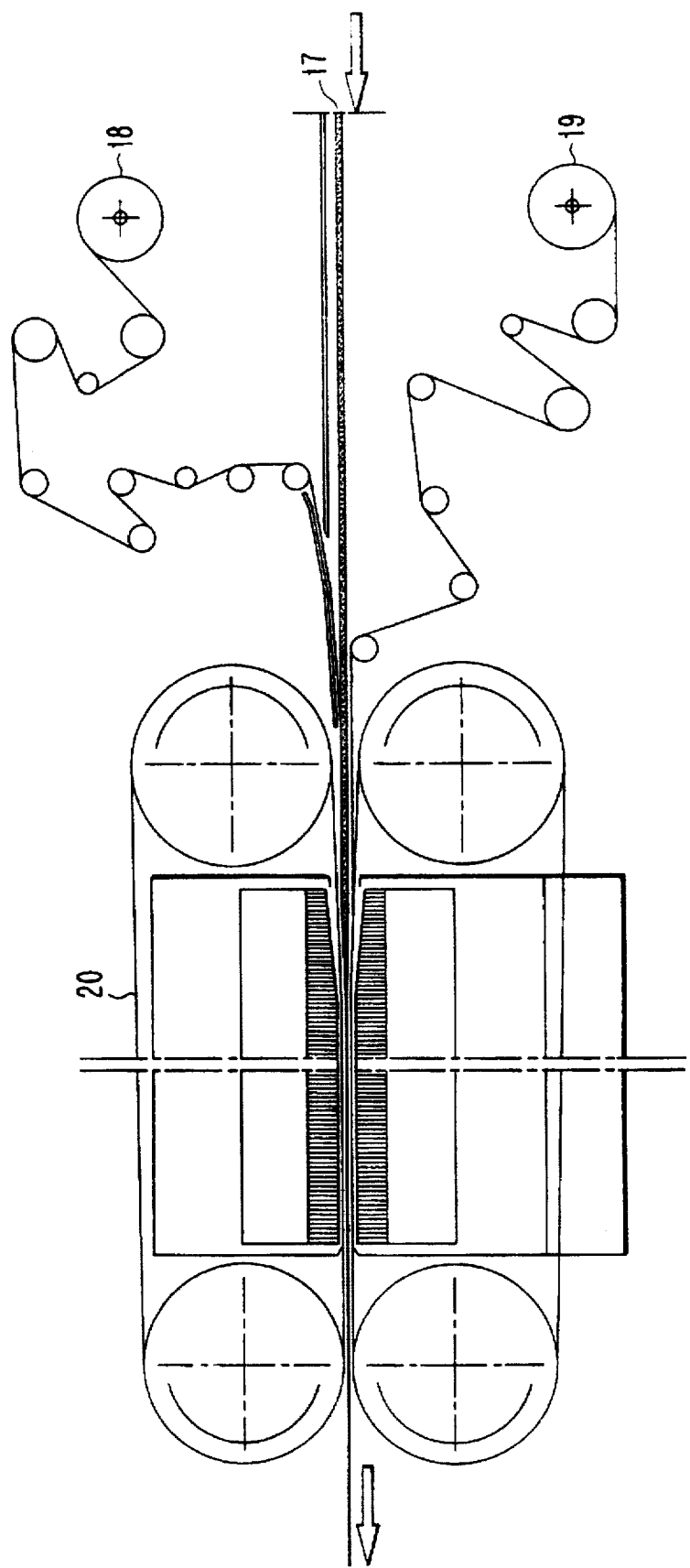

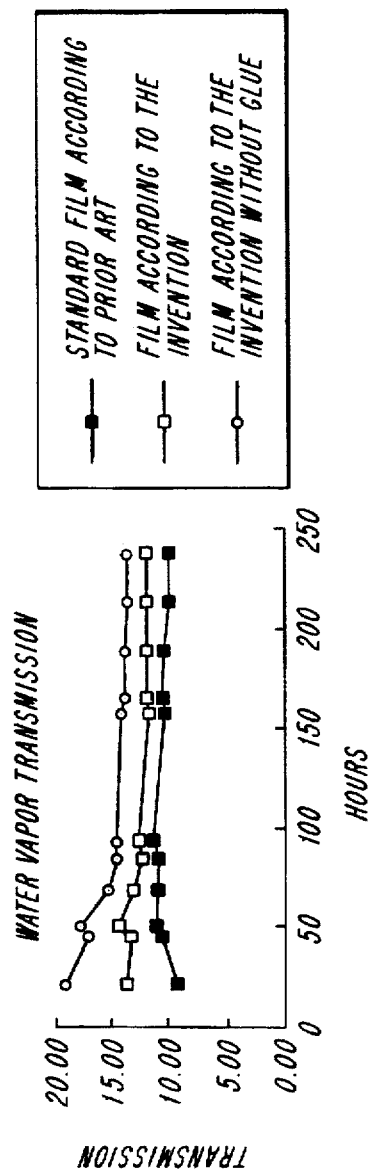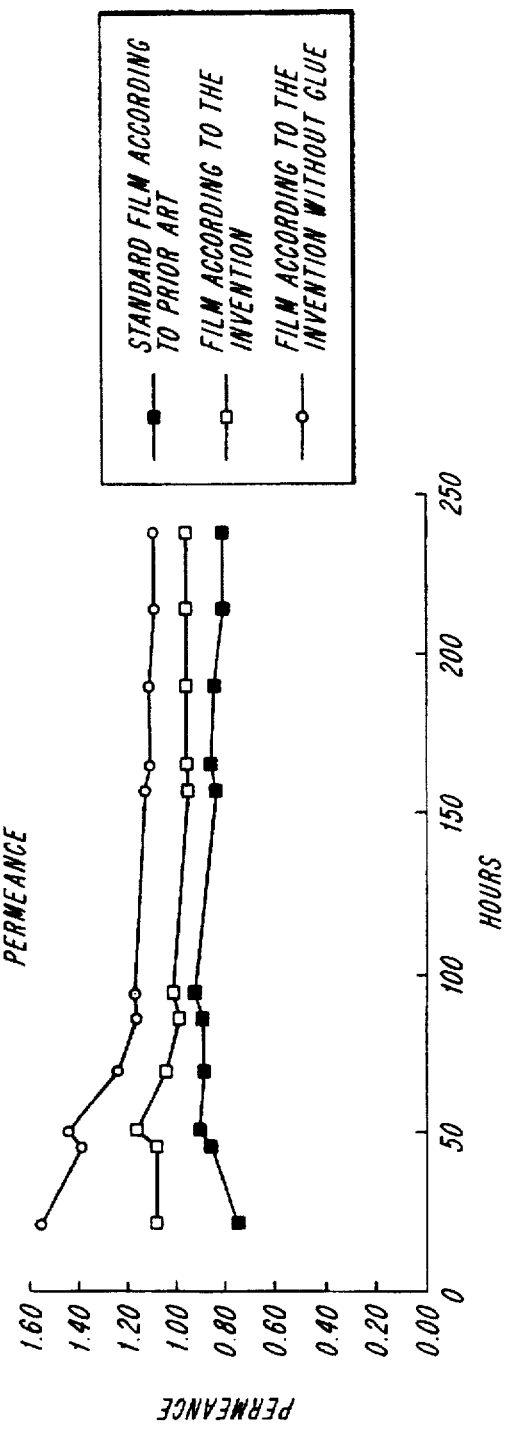

FILM COMPOSITE

The present invention relates to a film suitable in the production of laminated particle boards, a method for producing the film and a method for producing laminated particle boards with the use of the film.

BACKGROUND OF THE INVENTION

Cellulose papers with a weight of between 40 and 140 grams per square meter untreated are normally used when making decorative foils. The papers can be impregnated with melamine thermosetting resins or left untreated. Such foils require an adhesive for lamination. The degree of impregnation and the percentage of resin used have a direct effect on the internal bond strength of the paper, as well as on the porosity, cutting qualities and machinability. The essentially untreated papers can contain a small amount of resin (2–3%) which generally is added during manufacturing. The papers can be delivered with a varnish top coat or can be top coated after lamination.

Preimpregnated papers are papers treated during the paper making process with a resin system such as melamine or urea formaldehyde, usually together with acrylic, which allows the sheet to remain flexible after the resins are fully cured. The resin is supplied through a size press and calendered, either on the paper machine or later. The calendering provides a good printable surface and which surface is easily coated. These papers can be chemically embossed and are also available with pre-applied hot melt adhesives.

Papers can also be treated, after they have been manufactured, with a similar resin system as previously stated, so called post-impregnated papers. In these papers the paper fibres are encapsulated with resin and the voids and air spaces in the paper are filled with resin. The papers may be top coated and may have hot melt adhesives applied at the point of manufacture.

When producing a laminated particle board according to the prior art the particle board or agglomerate is first pressed and after the final pressing step, sanded to make the surface smooth and then a layer of glue is applied followed by application of a sheet of film or foil as described above and then heating and compressing the assembly. This method for producing laminated particle boards according to the prior art can be carried out continously or step-wise.

With a conventional foil or film the gases produced by the particle board during a direct laminating process would remain trapped inside which gives rise to the formation of bubbles between the film and the particle board which may cause the film to burst.

SUMMARY OF THE INVENTION

An object according to the present invention is to provide a film by means of which the above described drawbacks of the prior art are overcome.

Another object of the present invention is to provide a method by means of which a film is obtained which film has suitable properties which makes it especially suited for the production of laminated particle boards by means of a continuous process.

A further object according to the present invention is to provide a method for producing a laminated particle board by means of a continous process with such film.

BRIEF DESCRIPTION OF THE DRAWINGS

FIG. 2 illustrates a direct lamination process according to the present invention.

FIG. 3 is a plot of water vapour transmission (3a) and water vapour permeance (3b) respectively against time for films according to the present invention and standard films used according to the prior art.

DETAILED DESCRIPTION OF THE INVENTION

Figure 1:
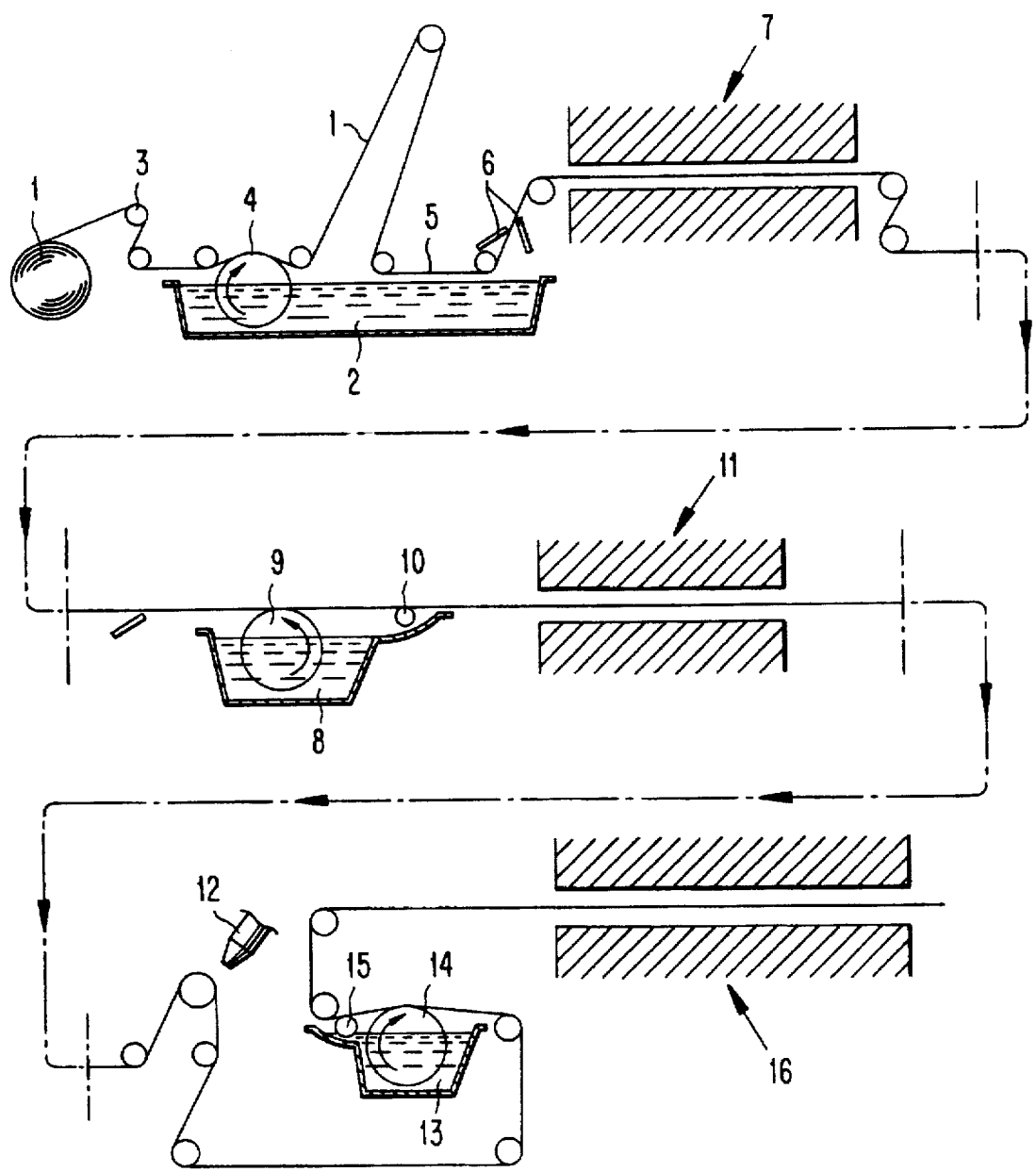
FIG. 1 illustrates schematically a process for making the film according to the present invention.

The film according to the present invention comprises a base paper with a weight of from 30 to 150 g/m² which is impregnated with resins which are almost fully cured and are permeable to the gases formed within the particle board (agglomerate) during the production of the laminated particle board. Furthermore, the film is provided with a partially cured layer of glue on the side facing the particle board and a fully cured lacquer or varnish layer on the top. The finished film thus comprises a fully cured lacquer which is gas-permeable, a mixture of impregnating resins, which mixture also is gas-permeable and is in a semi-cured condition and is cured to at least 95%, and a layer of glue, which is partially cured.

Important properties of the films according to the present invention are their water vapor transmission and water vapour permeance. These properties can be measured according to the standard ASTM E-96. Both the water vapour transmission and the water vapour permeance of the films according to the present invention are higher than the corresponding properties of standard films used according to the prior art when making laminated boards. Measurements of these properties as a function of time, which measurements have been carried out in accordance with ASTM E-96, are shown in FIG. 3 and table I wherein transmission and permeance values measured on a film according to the present invention and on a standard film according to the prior art are shown. Furthermore, the corresponding properties have also been measured for a film according to the present invention without the glue layer, since in fact said glue melts inside the continuous presses in the lamination process and thus does not influence the water vapour transmission or permeance to any substantial extent during said pressing. The compositions of the films used in said measurements were the following:

1. Film according to the present invention:

Paper base: 70 g/m² Impregnating resin: UF Resin 38% Acrylics 38% Water 24% Resin saturation: 26% Curing degree: 97% Glue: Melamine resin+Polyvinyl Alcohol Glue layer: 15 g/m² dry Curing degree: 93% Lacquer: Polyester/Methoxy methyl melamine Lacquer layer: 10 g/m² dry 2. Film according to the present invention without glue:

The same as 1 without the 15 g/m² of dry glue

3. Standard film used according to the prior art:

Paper base: 71 g/m² Impregnated resin: UF resin 80% Acrylic 12% Water 6% Curing degree: Fully cured Resin saturation: 33% Lacquer 1: Acrylic Lacquer 1 layer: 8 g/m² Lacquer 2: Polyester/Methoxy methyl melamine Lacquer 2 layer: 10 g/m²

TABLE I

| HUMIDITY | 50% |
|---|---|
| AREA = | 18,1 cm$^2$ |
| TEMPERATURE | 25,5° C. |
| VAPOUR PRESSURE | 24,5 mm Hg |

| Time, | Standard film | | Film according to the invention | | Film according to the invention without glue | |
|---|---|---|---|---|---|---|
| hour | WVT | Permeance | WVT | Permeance | WVT | Permeance |
| 24 | 9,21 | 0,75 | 13,35 | 1,09 | 19,11 | 1,56 |
| 48 | 10,47 | 0,86 | 13,24 | 1,08 | 17,03 | 1,39 |
| 53 | 10,95 | 0,89 | 14,18 | 1,16 | 17,72 | 1,45 |
| 72 | 10,74 | 0,88 | 12,74 | 1,04 | 15,19 | 1,24 |
| 89 | 10,86 | 0,89 | 12,11 | 0,99 | 14,28 | 1,17 |
| 96 | 11,22 | 0,92 | 12,37 | 1,01 | 14,39 | 1,17 |
| 160 | 10,19 | 0,83 | 11,57 | 0,94 | 13,81 | 1,13 |
| 168 | 10,36 | 0,85 | 11,67 | 0,95 | 13,48 | 1,10 |
| 192 | 10,22 | 0,83 | 11,65 | 0,95 | 13,52 | 1,10 |
| 216 | 9,85 | 0,80 | 11,64 | 0,95 | 13,30 | 1,09 |
| 240 % | 9,78 | 0,80 | 11,63 | 0,95 | 13,35 | 1,09 |

From the FIG. 3 and the table it can be seen that the film according to the present invention has a water vapour transmission according to ASTM E-96 of above 11,5 g.h$^{-1}$.m$^{-2}$ and a water vapour permeance of at least 0.94 kg·Pa$^{-1}$·s$^{-1}$·m$^{-2}$. The film according to the present invention without glue has a water vapour transmission of at least 13.3 and a water vapour permeance of at least 1.09. The corresponding values for a standard film used according to the prior art are lower, viz. a water vapour transmission of below 11.2 and a water vapour permeance below 0.92. From this comparison it can be clearly seen that the films according to the present invention possess much better water vapour transmission and water vapour permeance than the films according to the prior art. Thus, a film according to the invention should have a water vapour transmission of at least 11 g.h$^{-1}$.m$^{-2}$, preferably at least 12.5, with the glue layer and at least 13 g.h$^{-1}$.m$^{-2}$ without the glue, and a water vapour permeance of at least 0.9 kg.Pa$^{-1}$.s$^{-1}$.m$^{-2}$ preferably at least 1.05, with the glue layer, and at least 1.1 kg.Pa$^{-1}$.s$^{-1}$.m$^{-2}$ without the glue.

The film according to the present invention has a larger thickness and stiffness as compared to a preimpregnated foil as used according to the prior art. These properties provide the film with a better capacity for hiding irregularities of the surface of the boards which means that the requirement of sanding the particle board before the laminating process is not critical as in the prior art methods.

The lacquers to be used in the manufacturing of the film must all fulfil the condition of possessing a good heat resistance. Suitable lacquers are those containing polyesters or acrylic resins as binders and etherified melamines such as methoxymethyl melamine, or methoxy ureas as cross-linking agents. As a catalyst for the curing reaction a strong acid is used. Curing can also be provided by UV radiation when using acrylic or polyester lacquers. It is also possible to use polyurethanes (saturated) but these are very expensive.

As impregnating resins combinations of urea-formaldehyde resins and acrylic emulsions are suitable. A suitable weight proportion between urea-formaldehyde resin and acrylic emulsion is from 75:25 to 40:60, preferably 70:30 to 50:50, depending on the hardness of the acrylic emulsion. After impregnating the resin is semi-cured to a curing degree above 95%, preferably 96 to 98%.

Suitable glues to be used in the film according to the present invention are resins of melamine-formaldehyde and/ or urea-formaldehyde. Thermosetting acrylic resins can also be used as glues. The glue is partially cured in known manner, suitably to a curing degree of 90–95%, preferably 91–94%.

When making the film according to the present invention certain parameters have to be observed. Thus, the unimpregnated paper should have a porosity within certain limits such as a Gurley porosity of 8–20 seconds/100 ml, preferably 10–13 seconds/100 ml, and a smoothness according to Bendtsen of 80–150 ml/minute, preferably 90–110 ml/minute. The basis weight for the untreated paper is from 30 to 150 g/m$^2$, a suitable weight being 70–80 g/m$^2$. An example of a suitable film (foil) according to the invention has a final weight of 115–120 g/m$^2$, with lacquer applied in an amount of 10–12 g/m$^2$, dry, and impregnating resin in an amount of 22–24 g/m$^2$, which means a per cent resin saturation of from 24 to 26% for a base paper with a weight of 70 g/m$^2$.

It is preferred that the amount of impregnating resin does not go below a certain limit, viz 18%.

The method for producing the film, which is another object of the present invention, comprises the following essential steps:

a) impregnating a cellulose support which is a web of base paper, which can have a paper weight of 70–80 g/m$^2$ with resins which are permeable to the gases formed within the particle board, b) passing the resin-impregnated paper web through an oven for semi-curing the impregnating resin, c) passing the semi-cured, impregnated paper web to a glue bath to provide it with a glue layer, d) passing the glued, partially cured impregnated paper web through an oven for further curing and drying, e) passing the paper web to a lacquer bath to provide it with a top lacquer layer, and then f) passing the lacquered impregnated paper web provided with a glue layer through an oven for further curing and drying whereby the finished film is obtained.

If when using acrylic or polyester lacquers, curing is carried out by UV radiation a UV-tunnel is included before the oven.

The finished film can be fed to a particle board line which particle board is composed of a cake of wood chips wetted with glue for direct continous manufacturing of laminated board. At this stage it is possible to feed one or two films with the cake for coating one or two faces of the cake.

In this laminating step it is very important that the films are steam penetrable since during the pressing the glue condenses and produces water which must escape through the film for avoiding bubbles or/and explosions. At the exit of the presses laminated particle board is obtained which can be used directly for decorative purposes.

This last-mentioned laminating step should be compared with a standard process for obtaining a similar product. In the final pressing step of the standard product the resulting raw particle board (cake of wood chips) is sanded (thickness must be calibrated). After this the glue is applied to the board on the surface to be laminated with the film and the board together with the standard film is pressed for drying and curing the glue. This process according to the prior art is more troublesome and time-consuming than the direct laminating process according to the present invention.

In FIG. 1 a roll of paper (1) with pigments is used as the base of the film. (2) is a resin bath with a suitable combination of impregnating resins and (3) is guide rollers which guide the paper web to the resin bath where the resin penetrates the paper web by capillary action in regions (4) and (5). When leaving the bath (2) the web is scraped with two scrapers (6) for elimination of excess of resin.

The impregnated web then passes through an oven (7) wherein it is heated for drying and partial curing of the impregnating resin. The web is then cooled by means of water-cooled rollers.

After this oven treatment the impregnated web passes a glue bath (8) containing a suitable glue or mixtures of glues which is applied by means of a roller rotating in a counter-current direction to a motion of the web. The amount of glue applied is metered by means of a threaded bar (10) and then the web passes through an oven (11) for heat treatment and is later cooled with cold air by means of a blower (12).

A system analogous to that used for applying the glue is used to apply a lacquer on the top of the web in a lacquer bath (13) in which a roller (14) rotates in a counter-current direction to the motion of the web and the amount of lacquer applied being metered by means of a threaded bar (15).

It is to be noted that, if desired, the last-mentioned lacquering step can take place before the glueing step which means that the glue and the lacquer can be applied in any order, i.e. either the glue before the lacquer or the lacquer before the glue.

FIG. 2 illustrates a direct lamination process according to the present invention by means of which a laminated particle board is prepared wherein a cake (17) of wood chips wetted with glue is coated on both sides with films (18, 19) according to the present invention, which films may be of the same composition or of different compositions. The particle board with films on each side is pressed in continuous presses (20) comprising: Two stainless steel belts preferably chromized tensioned between two big dimensioned drums at top and bottom are driven in opposite directions. The belt drums are installed in frames and are heated. The two out feed rollers are driven normally by DC drive units. The two steel belts, which face both each other, run through heating and pressure zones, in which the glue wetting the chips of the cake inserted in the front side is cured.

The following examples illustrate a film and a method for its production according to the present invention (Example 1) and a direct lamination process according to the present invention with the use of a film according to the present invention (Example 2). The examples are only illustrative and are not intended to limit the invention in any way.

EXAMPLE 1

In a plant of a construction as shown in FIG. 1 a film according to the present invention was produced in the following manner.

A roll of paper web (1) of a base paper with a weight of 70 g/m$^2$ with pigment which was used as the base of the film was passed through guide rollers (3) to a bath (2) containing a combination of resins comprising:

I) urea-formaldehyde, 80 liters, 95 kg and with a molar ratio urea-formaldehyde of 1:2, II) an acrylic emulsion, 60 liters, 63.6 kg such as Primal FS-100 from Rohm and Haas, and III) an acrylic emulsion, 20 liters, 21.1 kg such as Primal HA-12.

The combination of impregnation resins was added in regions (4) and (5) by capillary action. Any excess of resin was removed with two scrapers (6). The amount of resin added must be correct in order to provide the necessary mechanical properties to the film and to provide the necessary permeability to gases of the finished film. The impregnation bath also contained 85 liters of water and an emulsifier.

After the impregnation bath the web passed through an oven (7) where it was subjected to a temperature between 90 and 120 C. for 15 seconds in order to obtain a semi-cured resin having a curing degree of about 97%.

Then the web was cooled by means of water-cooled rollers whereafter it passed a glue bath (8) where the glue was applied by means of a roller (9) rotating in counter-current direction to the motion of the web. The glue comprised melamine/formaldehyde resin with a molar ratio melamine/formaldehyde of 1:1.8 and also a partially saponified polyvinyl alcohol. The partially saponified polyvinyl alcohol improves the penetration of the glue into the impregnated base paper.

The amount of glue applied was controlled by means of the threaded bar (10) to give between 13 and 15 grams of dry glue per square meter of the finished film.

The web then passed through an oven (11) at a temperature between 100 and 150° C. for 7 seconds and was then cooled with cold air by means of a blower (12). A curing degree of about 93% was obtained.

The web then passed through a system analogous to that used for applying the glue in order to varnish the web in a varnish bath (13) in which a roller (14) rotated in counter-current direction to the motion of the web and the amount of varnish applied was controlled by means of a threaded bar (15).

Finally, the film passed through an oven (16) for drying and curing at a temperature of between 120 and 170° C. for about 15 seconds and was cooled afterwards by means of rollers cooled by cold water.

EXAMPLE 2

A film according to the present invention with a final weight of 115–120 g/m$^2$ impregnated with a mixture of impregnation resins in an amount of 22–24 g/m$^2$ and with a glue layer on one side of 13–15 g/m$^2$ dry and a lacquer layer on the other side in an amount of 10–12 g/m$^2$ dry was used in making a laminated particle board according to the present invention in a plant as illustrated in FIG. 2. A particle board (17) comprising a cake of wood chips wetted with glue was fed to continuous presses used for particle board production together with two films as prepared in Example 1 for coating the two faces of the cake. The films were steam penetrable so that when the glue condensed and produced water during the pressing this water could escape through the film so that bubbles or/and explosions were avoided. At the exit of the press a particle board coated on both sides was obtained which could be directly used for decorative purposes. In the pressing a speed of 10 m/minute was used and the belt temperature was 165° C.

I claim:

1. A steam penetrable fill which comprises a base paper with a weight of from 30 to 150 g/m$^2$ impregnated with resins which are semi-cured to a curing degree above 95% and are permeable to gases formed within particle board during the production of laminated particle board, which fill on one side is provided with a partially cured layer of glue and on the other side, a fully cured lacquer layer which is permeable to gases generated during the production of laminated particle board and which film has a water vapor transmission according to ASTM E-96 of above 11 g.h$^{-1}$.m$^{-2}$ and a water vapor permeance of at least 0.9 kg.Pa$^{-1}$.s$^{-1}$.m$^{-2}$, said film possessing the property of being able to be applied to particle boards in a direct continuous process.

2. A film according to claim 1, wherein said impregnating resins comprise combinations of urea-formaldehyde resins and acrylic emulsions, in a weight proportion from 75:25 to 40:60.

3. A film according to claim 1, wherein said glue comprises a resin of melamine-formaldehyde which gives a water-resistant product.

4. A film according to claim 1, wherein said glue comprises a resin of urea-formaldehyde.

5. A film according to claim 1, wherein said glue comprises a thermosetting acrylic resin.

6. A film according to claim 1, wherein said lacquer comprises a polyester/methoxy methyl melamine lacquer.

7. A film according to claim 1, wherein, said lacquer comprises a acrylic/methoxy methyl melamine lacquer.

8. A film according to claim 1, wherein said lacquer comprises an acrylic or polyester lacquer cured with UV radiation.

9. A method for producing a steam permeable film which comprises the steps:

(a) impregnating of a cellulose web with impregnating resins which are permeable to the gases formed within the agglomerate, (b) passing the resin-impregnated cellulose web through an oven for heating and semi-curing, (c) passing the impregnated, semi-cured cellulose web to a glue bath, (d) passing the impregnated, semi-cured cellulose web provided with a glue layer through an oven for partially curing, (e) passing the cellulose web to a lacquer bath where the web obtains a lacquer top coat and then (f) passing the web through an oven for curing the lacquer, wherein step e) if desired can be carried out before steps c) and d) whereby a stem penetrable cellulose film provided with top lacquer coat which is fully cured, impregnated with a mixture of semi-cured impregnating resins and a bottom layer of partially cured glue is obtained, said film possessing the property of being able to be applied to particle boards by means of continuous application.

10. A method according to claim 9, wherein a UV tunnel is included before the lacquer curing oven and the top lacquer comprises acrylic or polyester lacquer curable with UV radiation.

11. A method for producing a laminated particle board by means of a continuous direct lamination process, wherein on a moving bed of glued wood chips is applied on one or both sides a steam penetrable film comprising a cellulose web impregnated with impregnating resins which are combinations of urea-formaldehyde resins and acrylic emulsions, semi-cured to a curing degree above 95% which web on the surface which contacts the bed of wood chips is provided with a partially cured formaldehyde based glue and which web on the other side is provided with a fully cured heat-resistant lacquer containing polyester or acrylic resin as a binder wherein the bed of glued wood chips and the films are led to and pressed in continuous presses for continuous direct production of a laminate.

12. A fill according to claim 2 wherein the weight proportion is from 70:30 to 50:50.

* * * * *